United States Patent [19]

Choi et al.

[11] Patent Number: 5,863,980
[45] Date of Patent: Jan. 26, 1999

[54] PREPARATION PROCESS OF POLYURETHANE PREPOLYMER, PREPARATION PROCESS OF AQUEOUS DISPERSION OBTAINED THEREFROM, AND USE THEREOF

[75] Inventors: Keun-Bae Choi; Ki-Soo Kim; Hyoung-Sug Kim; Seog-Jae Lee, all of Kyungki-Do, Rep. of Korea

[73] Assignee: Hepce Chem Co., Ltd., Rep. of Korea

[21] Appl. No.: 772,167

[22] Filed: Dec. 20, 1996

[30] Foreign Application Priority Data

Dec. 20, 1995 [KR] Rep. of Korea ............ 1995 52369

[51] Int. Cl.$^6$ ............... C08J 3/00; C08K 3/20; C08L 75/00; C08G 18/00
[52] U.S. Cl. ............... 524/591; 524/590; 524/839; 524/840; 528/44; 528/60; 528/73; 528/75; 528/80; 528/81; 528/85
[58] Field of Search ............... 524/590, 591, 524/839, 840; 528/44, 60, 73, 75, 80, 81, 85

[56] References Cited

U.S. PATENT DOCUMENTS 3,923,713  12/1975  Hermann ............... 260/29.2
4,172,191  10/1979  Nachtkamp et al. ............ 528/61
4,238,378  12/1980  Markusch et al. ............ 260/29.2
4,250,077   2/1981  von Bonin et al. ............ 260/37
4,460,738   7/1984  Frentzel et al. ............ 524/591

*Primary Examiner*—Patrick D. Niland
*Attorney, Agent, or Firm*—Ostrolenk, Faber, Gerb & Soffen, LLP

[57] ABSTRACT

A process for preparing a polyurethane prepolymer containing carboxylic group(s), or both carboxylic group(s) and double bond(s), which comprises the steps of 1) preparing a diol or triol monomer having carboxylic group(s), or having both carboxylic group(s) and double bond(s) by performing an addition reaction of at least one acid anhydride(s) which may contain double bond(s), with at least one triol or tetraol derivative(s) containing three or four hydroxyl groups in a molar ratio from 0.5:1 to 2:1; and then 2) reacting the obtained diol or triol monomer, or their mixture with a polyol and a diisocyanate or a diisocyanate polymer to give polyurethane prepolymer having an NCO content of 0.1 to 30%, is disclosed. In addition, a process for preparing a water-stable aqueous polyurethane dispersion by neutralizing, dispersing, and chain extending the polyurethane prepolymer obtained above is provided. As the polyurethane dispersion according has excellent luster, elasticity, and water-repellency, it is very useful as a coating agent, an adhesive, or a paper sizing agent.

29 Claims, No Drawings

PREPARATION PROCESS OF POLYURETHANE PREPOLYMER, PREPARATION PROCESS OF AQUEOUS DISPERSION OBTAINED THEREFROM, AND USE THEREOF

BACKGROUND OF THE INVENTION

1. Field of the Invention

The present invention relates to a process for preparing a polyurethane prepolymer, which comprises addition reacting acid anhydride derivative with triol or tetraol compound to give a diol or triol monomer which has carboxylic acid moiety or both carboxylic acid moiety and a double bond, and reacting polyol with diisocyanate by the use of the diol or triol monomer to prepare polyurethane prepolymer; and a process for preparing a water-stable aqueous polyurethane dispersion by neutralizing the polyurethane prepolymer obtained as above, dispersing it in water, and performing a chain extension.

Further, the present invention relates to a use of the aqueous polyurethane dispersion for a coating agent, an adhesive agent, a fiber treating agent, a paper processing agent, a leather treating agent, an adhesive for plywood, a blending agent for cement, a resin for synthetic leathers, or the like.

2. Prior Arts

A variety of processes for preparing aqueous polyurethane dispersions have been known. The dispersions are largely divided into two groups of ionic type and nonionic type, depending on the existence or non-existence of ion in the chain. Ionic type dispersions are divided into anionic type and cationic type.

In case of anionic type, sulfonate type and carboxylate type dispersions are widely used, while in case of cationic type, quaternary amine type dispersions are widely used. The most general type among these is anionic type including a carboxylic acid moiety.

In other words, a water-dispersible polyurethane is obtained by admixing dimethylolpropionic acid (DMPA) having carboxylic acid with the polyol or diisocyanate to perform an addition reaction to give a prepolymer whose end is terminated by NCO; neutralizing and dispersing the prepolymer in water by self-emulsification; and performing a chain extension reaction. In the process, a variety of methods have been disclosed on the introduction of a hydrophilic group (for example, —COOH group) which is able to be self-emulsified.

For instance, according to the disclosure of U.S. Pat. No. 4,250,077 (issued to von Bonin et al.), an unsaturated carboxylic acid having double bond(s) was mixed with various type of polyols, and the mixture was homopolymerized with a free radical initiator to obtain a graft polymer. In other words, a carboxylic group is introduced by graft polymerization to the main chain. In the patent, the precise mechanism of the polymerization is not shown.

U.S. Pat. No. 4,460,738 (issued to Frentzel et al.) discloses a process where a carboxylic group is introduced by a free radical addition reaction on a main chain of polyether polyol, which is an oxyalkylene adduct. By using tripropyleneglycol as a polyether polyol, and maleic acid, fumaric acid, or itaconic acid as a monomer having carboxylic group(s), and by introducing a peroxide-type free radical initiator thereinto, a polyether polyol having carboxylic acid was prepared in a radical addition reaction.

SUMMARY OF THE INVENTION

It is an object of the present invention to provide a novel process for preparing a polyurethane prepolymer.

It is another object of the present invention to provide a process for preparing a water-stable aqueous polyurethane dispersion by neutralizing the polyurethane prepolymer obtained as above.

According to one aspect of the present invention, there is provided a process for preparing a polyurethane prepolymer containing carboxylic group(s), or both carboxylic group(s) and double bond(s), which comprises the steps of 1) preparing a diol or triol monomer having carboxylic group(s), or having both carboxylic group(s) and double bond(s) by performing an addition reaction of at least one acid anhydride(s) which may contain double bond(s), with at least one triol or tetraol derivative(s) containing three or four hydroxyl groups in a molar ratio from 0.5:1 to 2:1; and then reacting the obtained diol or triol monomer, or their mixture with a polyol, and a diisocyanate or a diisocyanate polymer to give a polyurethane prepolymer having an NCO content of 0.1 to 30%.

A process for preparing water-stable aqueous polyurethane dispersion by neutralizing, dispersing and chain extending the polyurethane prepolymer obtained above is also provided.

According to the arts up to the present, there has not been a process for introducing carboxylic group(s) by addition of an acid anhydride derivative with an equimolar amount of a low molecular tri-functional polyol, a tri-functional, or a tetra-functional tetraol monomer, or a mixture thereof. This is very surprising since such a process is advantageous in that the synthetic apparatus and condition are very simple and the operation thereof is easy. Besides, it has a great advantage in that various functional groups can be introduced depending on the type of the acid anhydride derivatives, in particular, carboxylic group(s) and double bond(s) can be introduced simultaneously. In addition, it has a great advantage in that a water-stable aqueous polyurethane dispersion can be prepared by preparing a urethane prepolymer by using a thus prepared diol or triol monomer wherein the carboxylic group has been introduced, neutralizing the carboxylic group to obtain a hydrophilic site, dispersing the urethane prepolymer into water and performing a chain extension reaction. Particularly, in case that double bond(s) is/are simultaneously introduced, it is noticeable that an aqueous polyurethane dispersion of better physical properties can be obtained by adding a small amount of a thermal curing initiator, a UV curing initiator and/or a chain extending agent.

DETAILED DESCRIPTION OF THE INVENTION

The process for preparing a polyurethane prepolymer containing a carboxylic group or containing both a carboxylic group and a double bond, and the process for preparing an aqueous polyurethane dispersion from the prepolymer as mentioned above are novel processes. Here-in-after, these processes are explained in more detail.

1. A process for preparing a diol or triol monomer, or mixtures thereof which contain a carboxylic group, or contain both a carboxylic group and a double bond:

Described below is a process for preparing a diol or triol monomer or mixtures thereof which contain a carboxylic group or contain both a carboxylic group and a double bond by addition of triol or tetraol derivatives having 3 or 4 functional groups and a low molecular weight, or a mixture thereof to an acid anhydride, derivatives thereof, or a mixture thereof, according to the present invention. In the process, there is no restriction in device or technique. The process is a one-step reaction as shown in Scheme 1 below.

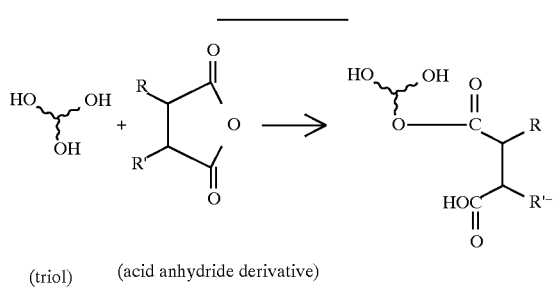

(triol)   (acid anhydride derivative)

Preferably, a monomer having three or four OH functional groups, a polytriol or a polytetraol of either an ether type or an ester type having a molecular weight of about 100–4000 is used as a triol or tetraol derivative. Preferably, as a triol monomer, trimethylolpropane (TMP), glycerol, or triethanolamine is used, while in the case of a triol derivative (polytriol), a triol derivative (polytriol) having a molecular weight of 100–1000 (castor oil, GP-250, GP-400, GP-280 manufactured by Korea Polyol Co.) is preferable. These triol derivatives may used alone or in a mixture form. Preferably, pentaerythritol or tris-(2-hydroxyethyl)isocyanurate (THEIC) is used as a tetraol monomer, while in the case of a tetraol derivative, a tetraol derivative having a molecular weight of 200–1500 is preferable. These tetraol derivatives may used alone or in a mixture form.

As an acid anhydride derivative containing only a carboxylic group, examples include succinic anhydride, glutaric anhydride, methylsuccinic anhydride, hexahydro-4-methylphthalic anhydride, cis-1,2-cyclohexanedicarboxylic anhydride, diglyconic anhydride, 3-ethyl-3-methylgluconic anhydride, phthalic anhydride, 3-nitrophthalic anhydride, 4-nitrophthalic anhydride, 1,2,4-benzenetricarboxylic anhydride, homophthalic anhydride, 2,3-pyridine dicarboxylic anhydride, 3,4-pyridine carboxylic anhydride, derivatives thereof, and mixtures thereof.

Examples of an acid anhydride containing both a carboxylic acid and a double bond, include maleic anhydride, fumaric anhydride, itaconic anhydride, bromomaleic anhydride, 3,4,5,6-tetrahydrophthalic anhydride, 2-dodecen-1-yl-succinic anhydride, cis-aconitic anhydride, derivatives thereof, and mixtures thereof may be mentioned. After reacting with polyol, these compounds simultaneously form a carboxylic group and a double bond. Particularly, the double bond thus formed has a role of enhancing the physical properties by incorporating the UV setting or thermal curing process in the curing system of the aqueous polyurethane dispersion.

This step is carried out under nitrogen atmosphere at an atmospheric pressure. No particular device is necessary.

As to the amount of reactants, 0.5–1 mole of acid anhydride derivative to 1 mole of triol, and 0.5–2.0 mole of acid anhydride derivative to 1 mole of tetraol are desirable.

A solvent is not necessarily used in the reaction, but a change in viscosity may occur depending on the type of acid anhydride derivative. If the reaction cannot be readily performed because of high viscosity, a solvent may be used. The solvent may be used after the reaction is completed.

The reaction temperature is preferably selected between 50° C. and 200° C., more preferably between 100° C. and 150° C.

The reaction time depends on the reaction temperature, and it is preferably selected between 60 minutes and 180 minutes.

The products thus obtained is not soluble in water, in general. However, the products can be dispersed when at least a part of the carboxylic groups is neutralized by a general neutralizer (inorganic or organic base) to form ionic groups which can be dispersed in water. The process is generally known to a person who has ordinary skill in the art.

2. Preparation of Polyurethane Prepolymer

Polyurethane prepolymer is prepared by mixing a diol monomer containing a carboxylic group or containing both a carboxylic group and a double bond, with polyol, and then reacting the mixture with a diisocyanate monomer or polyisocyanate in a conventional reaction condition.

A polyether polyol, a polyester polyol, or a mixture thereof is preferably used as a polyol.

Polyoxyalkylene polyols of various type having 2 to 8 hydroxy groups, or a mixture thereof are preferably used as a polyether polyol. The molecular weight is preferably 300 to 6,500. It can be prepared, according to a known method, by random addition or stepwise addition through condensation of alkylene oxide (or mixture thereof) with polyhydric initiator (or mixture thereof). In the process, alkylene oxides such as ethylene oxide, propylene oxide, butylene oxide, amylene oxide, or styrene oxide; halogenated alkylene oxides such as chlorobutylene oxide; tetrahydrofuran; or epichlorohydrin may be used as an alkylene oxide. In particular, as a polyether polyol prepared by the above method, PP-750, PP-950, PP-1000, PP-2000, PP-3000, PP-4000, GP-400, GP-280, GP-1000, GP-3000, GP-4000, or GL-3000 manufactured by Korea Polyol Co. can be properly used.

Polyester polyol can be synthesized by a reaction of polycarboxylic acid with polyhydric alcohol. Examples of polycarboxylic acid include oxalic acid, malonic acid, succinic acid, adipic acid, pimelic acid, subersic acid, azelaic acid, sebacinic acid, bracilic acid, taphsic acid, maleic acid, fumaric acid, glutaconic acid, α-hydromuconic acid, β-hydromuconic acid, isophthalic acid, terephthalic acid, hemimelitic acid, 1,4-cyclohexanedicarboxylic acid, and a mixture thereof. Example of polyhydric alcohol include ethylene glycol, 1,3-propandiol. 1,4-butandiol, 1,3-butandiol, 1,2-butandiol, 1,5-pentandiol, 1,4-pentandiol, 1,3-pentandiol, 1,6-hexandiol, 1,7-heptandiol, diethylene glycol, triethylene glycol, dipropylene glycol, glycerol, 1,1,1-trimethylopropane, 1,1-triethyloethane, hexane-1,2,6-triol, α-ethylglucoside, pentaerythrithiol, sorbitol, and a mixture thereof.

An aromatic, alicyclic or aliphatic diisocyanate, or polyisocyanate is desirably used as a diisocyanate monomer or polyisocyanate.

Example of aliphatic diisocyanate include hexamethylenediisocyanate, 4,4-dicyclohexylmethane diisocyanate, 1,4-tetramethylene diisocyanate, 1,10-decamethylene diisocyanate, isophoron diisocyanate, 1,4-cyclohexane diisocyanate, and a mixture thereof. Example of aromatic diisocyanate include toluene-2,4-diisocyanate, toluene-2,6-diisocyanate, 1,5-naphthalene diisocyanate, 4-methoxy-1,3-phenylene disocyanate, 4-chloro-1,3-phenylene diisocyanate, 2,4-dimethyl-1,3-phenylene diisocyanate, 4,4-diisocyanate diphenyl ether, benzidine diisocyanate, 4,4'-diisocyanate dibenzyl, methylene-bis(4-phenylisocyanate)-1,3-phenylene diisocyanate, and a mixture thereof.

While the reaction may be carried out without a solvent, the reaction may be performed in the presence of a water-miscible solvent without any reactive hydrogen in an amount of up to 30% by weight of the reaction system.

The NCO content of the prepolymer obtained in the present invention is desirably 0.5–30%. The molecular weight of the above NCO-prepolymer is about 200–8,000. The ratio of isocyanate (NCO) group to hydroxy (OH) group of the reactant is preferably from 0.5:1 to 5:1, and more preferably from 1.1:1 to 2:1. The reaction temperature is preferably 25° C. to 150° C., and more preferably 25° C. to 100° C. In the reaction, though the reaction of NCO with carboxylic group does occur, the reaction rate is slower than the reaction of NCO with OH. Thus, under this reaction condition, some cross-linkage may be formed by amide bonds resulting from the reaction of NCO with COOH. Practically, some cross-linkage occurs in the stage of forming the polyurethane prepolymer.

3. Preparation of Polyurethane Dispersion

An aqueous polyurethane dispersion can be readily prepared from the polyurethane prepolymer obtained above. The stage generally includes the steps of (1) neutralizing the carboxylic group(s) with a neutralizer, (2) adding water to disperse the neutralized prepolymer, and (3) performing a chain-extension of the dispersed prepolymer with water or with a diamine, a diol, a triol, or a triamine containing an amine group having at least one reactive hydrogen per nitrogen atom, or a mixture thereof. The steps can be performed simultaneously.

In the neutralization reaction, a water-soluble tertiary amine, an alkali metal hydroxide, or a mixture thereof is preferably used as a neutralizer, although a conventional neutralizer may be used. In other words, triethylamine, sodium hydroxide, or potassium hydroxide is desirable as a neutralizer. Most preferably, the amount of the neutralizer is equal to the amount needed to neutralize all the carboxylic groups contained in the prepolymer. However, the amount may be the amount needed to neutralize only 50% of the whole amount of carboxylic groups. Thus the molar ratio of the carboxylic group to the neutralizer is desirably from 1:0.5 to 1:1.2.

Though the amount of water used varies depending upon the application field of the dispersion, it is preferable that the solid content of the finally formed dispersion is 5% to 80%. The desirable temperature of the water is 5° to 80° C.

The chain extension is performed by adding a chain extending agent to an NCO-prepolymer which can exist in an aqueous solution for a certain duration. As a chain extending agent, a compound having two reactive hydrogen atoms with molecular weight of 18 to 250, for example, water, diol, triol, diamine, triamine, hydrazine, dihydrazide, or the like, is preferably used. As a diamine, ethylene diamine is preferable. As another compounds, isophoron diamine, ethylene glycol, diethylene glycol, 1,4-butandiol, melamine, diethylene triamine (DETA), triethylene tetraamine (TETA), or the like is preferably used.

As additives other than the neutralizing agent and the chain extending agent, which are used for the preparation of aqueous polyurethane dispersion, thickening agents, pH adjusting agents, defoaming agents, or the like may be used. The use of a thickening agent (U.S. Pat. No. 3,923,713 (Hermann)) is desirable when a proper viscosity is needed to prepare a coating agent or an adhesive. As a thickening agent, methyl cellulose, hydroxyethylcellulose, polyacryl emulsion, alkali, or gums may be properly used. In addition, these dispersions may be used in a mixture with other dispersions (U.S. Pat. No. 4,238,378 (Markusch et al.)).

Further, in the dispersion according to the present invention, fillers, plasticizers, pigments, carbon black, silica sol, aluminum clay, or asbestos dispersions may also be dispersed.

In particular, when a diol monomer containing both a carboxylic group and a double bond is used in the aqueous polyurethane dispersion, a thermal curing initiator, a UV-curing initiator, or a mixture thereof may be added thereto. If required, a thermal curing chain extending agent or a UV-curing chain extending agent may be also added thereto.

A thermal curing initiator which initiates at a temperature between 50° C. and 200° C. may be preferably selected from organic or inorganic peroxides, azo compounds, hydroperoxides, organic metals, or their mixtures. The preferred amount of the initiator is 0.01–1% by mole to the whole molar amount of the carboxylic group with a double bond and the chain extending agent.

A UV-curing initiator may be preferably selected from a group consisting of benzoin compounds such as benzoin, benzoin methyl ether, benzoin ethyl ether, benzoin isobutyl ether, benzoin octyl ether, or the like; carbonyl compounds such as benzyl diacetyl, diethoxyacetophenone, 2,2-diethoxy-2-phenylacetophenone, 2-hydroxy-2-methylpropiophenone, 4'-isopropyl-2-hydroxy-2-methylpropiophenone, methylhydraquinone, acetophenone, benzophenone, benzoyl methyl formate, benzyl dimethyl ketal, or 1-hydroxycyclohexylphenyl ketone or 2-methyl-1-(4-methylthiophenyl)-2-morpholino-1-propene; sulfur compounds such as diphenyldisulfide or dithiocarbamate; naphthalenic compounds such as α-chloromethyl naphthalene; condensed aromatic hydrocarbons such as anthracene; and metal salts such as iron chloride, which initiates at the wavelength range of about 180 to 460 nm. The preferred amount of the initiator is 0.01–20 parts by weight to 100 parts by weight of the whole amount of the carboxylic group with a double bond and the optionally added chain extending agent. As a UV source for emitting UV rays of 180 to 460 nm wavelength, a low pressure mercury lamp, a medium pressure mercury lamp, a hyper pressure mercury lamp, a xenon mercury lamp, a UV fluorescent lamp, a carbon arc lamp, a non-electrode microwave type UV lamp, or the like is preferably used.

A thermal curing or a UV-curing chain extending agent may be selected from a group consisting of acrylate derivatives such as 2-ethylhexyl acrylate, 2-hydroxyethyl acrylate, 2-hydroxypropyl acrylate, 2-phenoxyethyl acrylate, isobornyl acrylate, tetrahydrofurfuryl acrylate, propylene glycol monoacrylate, butanediol diacrylate, 1,6-hexanediol diacrylate, neopentyl glycol diacrylate, diethylene glycol diacrylate, tripropylene glycol diacrylate, trimethylolpropane triacrylate, pentaerythritol triacrylate, glyceryl propoxylated triacrylate, pentaerythritol tetraacrylate, dipentaerythritol tetraacrylate, alkoxylated tetraacrylate and ditrimethylol propane tetraacrylate; styrene; acrylonitrile; vinyl chloride; and mixtures thereof. The preferable amount is 0.01 to 10% by weight of the overall solid content.

The aqueous polyurethane dispersion prepared according to the present invention has excellent solvent resistance, wearing resistance, toughness and elasticity, and can be dried rapidly and completely, so it may be advantageously used as a coating agent and/or adhesive for non-woven fabric, leather, plastic, wood, metal, or the like. As it has excellent luster, elasticity, and water-repellency, it may be advantageously used, in particular, as an adhesive for wood, a paper sizing agent, a paper coating agent, and a resin for a synthetic leather.

Above all, in the case of an aqueous polyurethane dispersion containing a double bond, chain extension occurs during the curing thereof to enhance its physical properties such as solvent resistance, abrasion resistance, toughness, and the surface appearance, so it is very useful as an adhesive and/or a coating agent for non-woven fabric, plastic, wood, metal, or the like.

Now, the present invention will be described in more detail by referring to the following examples.

Preparation of diol monomer containing carboxylic group by using succinic anhydride and phthalic anhydride

EXAMPLE 1

To a four-necked flask equipped with a stirrer, a dry nitrogen inlet and a reflux condenser, succinic anhydride (100.07 g) and polyether polyol (249 g/ Polyol A of Table 1) were added. While allowing a dry nitrogen gas to flow thereinto, the mixture was warmed to 80° C. to completely dissolve succinic anhydride. Then the temperature was slowly raised to 135° C. over a time span of about 30 minutes, and the reaction was performed at the same temperature for two hours. The unreacted succinic anhydride was thoroughly removed in vacuo. The progression of the reaction could be confirmed by an increase in viscosity. The product was finally confirmed by using FT-IR. The C=O peak of succinic anhydride disappeared at 1852.6 cm$^{-1}$, while the ester C=O peak and carboxylic C=O peak appeared at 1730 cm$^{-1}$ and 1648 cm$^{-1}$, respectively. In addition, it was confirmed that no by-product has been produced through the reaction. Table 1 shows the type and physical properties of polyols which are used in the Examples according to the present invention.

TABLE 1

| Polyol | Trade name | Hydroxy value | Functionality | MW | Component (%) | Manufacturer |
|---|---|---|---|---|---|---|
| A | GP-250 | 650–700 | 3 | 249 | PO-100 | Korea Polyol Co. |
| B | TMP | — | 3 | 134.18 | — | |
| C | Glycerol | — | 3 | 92.09 | — | |
| D | V-222-056 | — | 2 | 2000 | PO:EO = 95:5 | |
| E | PTMG-2000 | — | 2 | 2000 | BO = 100 | |
| F | PP-2000 | 54-58 | 2 | 2000 | PO = 100 | Korea Polyol Co. |
| G | GL-3000 | 52-56 | 3 | 3111 | PO:EO = 95:5 | |
| H | SE-1714 | 62.4–66.4 | 2 | 1740 | EG:DEG = 60:40 | Samsung Polymer Co. |
| I | SE-1541 | 73.6–75.8 | 2 | 1500 | EG:DEG = 60:40 | | cf) PO: Propylene Oxide
EO: Ethylene Oxide
EG: Ethylene Glycol
DEG: Diethylene Glycol
BO: Butanediol
TMP: Trimethylolpropane

EXAMPLE 2

The procedure of Example 1 was repeated except that phthalic anhydride (148.12 g) as an acid anhydride derivative, and polyether polyol (249 g/ polyol A of Table 1) were reacted at a reaction temperature of 150° C. for 2.5 hours. The progression of the reaction was confirmed by FT-IR and NMR. The result of FT-IR was the same as Example 1. In NMR spectrum, a proton peak of a benzene ring of pure phthalic acid, which had symmetrically appeared at 8 ppm, shifts down field as the reaction progressed, and an asymmetric multiplet at 7.5–7.9 ppm appears.

Preparation of a diol monomer containing both a carboxylic group and a double bond by using maleic anhydride

EXAMPLE 3

To a four-necked flask equipped with a stirrer, a dry nitrogen inlet, and a reflux condenser, maleic anhydride (98 g) and polyether polyol (249 g/ Polyol A of Table 1) were added. In order to prevent sublimation of maleic anhydride, a small amount of methylethyl ketone (MEK) was added. While allowing a dry nitrogen gas to flow thereinto, the mixture was warmed to 80° C. to completely dissolve maleic anhydride. Then the temperature was slowly raised to 150° C. and the reaction was performed at the same temperature for two hours. The unreacted maleic anhydride and solvent (MEK) were removed in vacuo. The progression of the reaction could be confirmed by an increase in viscosity. The product was finally confirmed by using FT-IR and NMR.

EXAMPLES 4–9

Reactions of Examples 1, 2 or 3 were carried out by using different triols in different reaction conditions. Triols B and C. of Table 1 were used. The reaction conditions are shown in Table 2 below.

TABLE 2

| | Diol Monomers | | | | | | | |
|---|---|---|---|---|---|---|---|---|
| | Polyol | | Anhydride Derivative | | Solvent | | Reaction Temp. | Reaction Time | Yield |
| No. | Type | wt % | Type | wt % | name | wt % | (°C.) | (hr) | (%) |
| 1 | A | 71.3 | SA | 28.7 | — | — | 135 | 2.5 | 98 |
| 2 | A | 62.7 | PA | 37.3 | — | — | 150 | 2.5 | 98 |
| 3 | A | 71.8 | MA | 28.2 | MEK | 5.7 | 150 | 2.5 | 97 |
| 4 | B | 57.3 | SA | 42.7 | — | — | 135 | 2.0 | 99 |
| 5 | B | 47.5 | PA | 52.5 | — | — | 150 | 2.0 | 99 |
| 6 | B | 57.8 | MA | 42.2 | MEK | 3.9 | 150 | 2.0 | 98 |
| 7 | C | 47.9 | SA | 52.1 | — | — | 135 | 2.0 | 99 |
| 8 | C | 38.3 | PA | 61.7 | — | — | 150 | 2.0 | 99 |
| 9 | C | 48.4 | MA | 51.6 | MEK | 2.9 | 150 | 2.0 | 98 | cf) SA: succinic anhydride
PA: phthalic anhydride
MA: maleic anhydride
MEK: methyl ethyl ketone In Table 2, shown are the type of triol and acid anhydride derivative used, the reaction condition, the reaction time and the yield. As a whole, the yield was 97% or more. The reaction time was almost constant about 2 hours. The yield depends very little on the type triol or the type of acid anhydride derivative that is used. It is thought that this is because there is no big difference in the reactivity of OH group with an acid anhydride between a triol. In the case of glycerol, water contained therein was completely removed before being used in the reaction.

Preparation of a polyurethane prepolymer by using a diol monomer containing both a carboxylic group and a double bond

EXAMPLE 10

To a four-necked flask equipped with a stirrer, a dry nitrogen inlet, and a reflux condenser, added were the diol monomer (41.7 g) containing a carboxylic group which had been obtained in Example 1, polyol D of Table 1 (119.4 g), DMF (10 g) as a solvent and dibutyltin dilaurate (0.0226 g). While allowing dry nitrogen to flow thereinto at 60° C., the reactants were fully mixed. Then, diphenylmethane-4,4'-diisocyanate ($H_{12}$-MDI, 33.0 g) and N,N-dimethylformamide (DMF/ 10 g) as a solvent were added thereto. The reaction mixture was reacted at 100° C. for 3 hours to obtain a polyurethane prepolymer having less NCO% content than a theoretical content.

EXAMPLES 11 and 12

The procedures of Example 10 were repeated except that the type of diol monomer containing a carboxyl group, or containing both a carboxylic group and a double bond has been changed. The amount of the changed material and theoretical NCO% content are shown in Table 3 below. As shown in Table 3, the theoretical NCO% content of these materials are 2.6 and 2.7, respectively. The NCO% content measured by titration was 2.5 in both case. It is thought that this is because of a side reaction of NCO with a carboxylic group, which generates amide and $CO_2$.

TABLE 3

| | | | | | | | | |
|---|---|---|---|---|---|---|---|---|
| | | Polyurethane prepolymers | | | | | | |
| | | Diol Monomers | | | | Isocyanate | free-NCO | Free-NCO Meas- |
| Exp. | Exp. | | | Polyol | | p-/$H_{12}$-MDI | Calcd. | ured |
| No. | No. | amount | Type | amount | (mole) | amount | wt % | wt % |
| 10 | 1 | 41.7 | D | 119.4 | 1/1 | 31.5/33.0 | 2.7 | 2.6 |
| 11 | 2 | 47.5 | D | 119.4 | 1/1 | 31.5/33.0 | 2.6 | 2.5 |
| 12 | 3 | 41.5 | D | 119.4 | 1/1 | 31.5/33.0 | 2.7 | 2.5 |
| 13 | 1 | 41.7 | E | 119.4 | 0/1 | 0/66.0 | 2.7 | 2.6 |
| 14 | 2 | 47.5 | E | 119.4 | 0/1 | 0/66.0 | 2.6 | 2.5 |
| 15 | 3 | 41.5 | E | 119.4 | 0/1 | 0/66.0 | 2.6 | 2.5 |
| 16 | 4 | 28.0 | H | 103.9 | 1/1 | 1.5/33.0 | 3.1 | 2.9 |
| 17 | 5 | 33.7 | H | 103.9 | 1/1 | 1.5/33.0 | 3.0 | 2.9 |
| 18 | 6 | 27.8 | H | 103.9 | 1/1 | 1.5/33.0 | 3.1 | 3.0 |
| 19 | 7 | 22.9 | I | 89.6 | 1/1 | 31.5/33.0 | 3.4 | 3.1 |
| 20 | 8 | 28.7 | I | 89.6 | 1/1 | 31.5/33.0 | 3.3 | 3.2 |
| 21 | 9 | 22.7 | I | 89.6 | 1/1 | 31.5/33.0 | 3.4 | 3.3 |
| 22 | 2 | 47.5 | F/G | 79.6/61.9 | 1/1 | 1.5/33.0 | 2.4 | 2.3 |

TABLE 3-continued

| | | Diol Monomers | | Polyol | Isocyanate p-/$H_{12}$-MDI | | free-NCO Calcd. | Free-NCO Measured |
|---|---|---|---|---|---|---|---|---|
| Exp. No. | Exp. No. | amount | Type | amount | (mole) | amount | wt % | wt % |
| 23 | 5 | 33.7 | F/G | 79.6/61.9 | 1/1 | 1.5/33.0 | 2.5 | 2.4 |
| 24 | 8 | 28.7 | F/G | 9.61 61.9 | 1/1 | 31.5/33.0 | 2.6 | 2.5 |

EXAMPLES 13–24

The procedures of Example 10 were repeated but the type of diol monomer containing a carboxyl group, or containing both a carboxylic group and a double bond, the type of polyol which functions as a soft segment, and the isocyanate ratio were all changed. The amount of the materials, the theoretical NCO% content, and the measured NCO% content are shown in Table 3 below.

In these Examples, the ratio of [NCO]/[OH] of the prepolymer was fixed, and a certain molar amount of diol monomer, and polyol, which functions as a soft segment, were added. It is noticeable that polyols (as a soft segment) having two or three functional groups were simultaneously introduced in Example 22–24, while aromatic and aliphatic isocyanates were simultaneously introduced in Example 16–24.

Preparation of an aqueous polyurethane dispersion by using a polyurethane prepolymer containing a carboxylic group, or containing both a carboxylic group and a double bond

EXAMPLES 25–39

To a mixture of the prepolymer prepared in Examples 10–24, a catalyst, and a solvent, triethylamine (as a neutralizing agent) were added in an amount equivalent to the amount of carboxylic acid which the prepolymer contains theoretically.

The neutralization was sufficiently performed for 10 minutes. While the mixture is vigorously stirred at 1000–2000 rpm, a certain amount of water was added at a constant rate to order to disperse the prepolymer. The amount of water was determined to be an amount needed to control the overall solid content of the final dispersion at 30% or 35%.

While continuously stirring the prepolymer thus dispersed, a mixture of ethylene diamine (chain extending agent) with water was slowly added drop-wise for about 5–10 minutes, and the mixture was stirred for 2 hours or more in order to perform a chain extension. During this stage, water was supplemented to control the overall solid content as 30% or 35%. The used amount of ethylene diamine was equivalent to the amount of the theoretical free-NCO. The solid content was calculated with all components except water and the solvent.

The type of polyurethane prepolymer used, the solid content, the particle size, and the viscosity are shown in Table 4. The viscosity was measured by using a viscosimeter of Brookfield DVLV-II+model, and the particle size was measured by Dynamic Light Scattering (DLS).

TABLE 4

| Exp. No. | PU-prepolymer Exp. No. | ED/NCO (eq. ratio) | Solid content (wt %) | Particle size of PU dispersion(nm) | Viscosity of PU dispersion (cps/25° C.) |
|---|---|---|---|---|---|
| 25 | 10 | 1.0 | 35.0 | 123.9 | 48.1 |
| 26 | 11 | 1.0 | 35.0 | 132.4 | 45.4 |
| 27 | 12 | 1.0 | 35.0 | 345.7 | 1230 |
| 28 | 13 | 1.0 | 35.0 | 40.1 | 13.4 |
| 29 | 14 | 1.0 | 35.0 | 43.3 | 12.3 |
| 30 | 15 | 1.0 | 35.0 | 107.8 | 508.2 |
| 31 | 16 | 1.0 | 35.0 | 70.0 | 28.3 |
| 32 | 17 | 1.0 | 35.0 | 71.5 | 27.0 |
| 33 | 18 | 1.0 | 35.0 | 201.2 | 748.3 |
| 34 | 19 | 1.0 | 35.0 | 64.9 | 33.4 |
| 35 | 20 | 1.0 | 35.0 | 66.6 | 30.1 |
| 36 | 21 | 1.0 | 35.0 | 163.3 | 525.3 |
| 37 | 22 | 1.0 | 30.0 | 557.9 | 3454 |
| 38 | 23 | 1.0 | 30.0 | 408.4 | 1943 |
| 39 | 24 | 1.0 | 30.0 | 382.3 | 1835 |

Preparation of a thermal curing and a UV-curing system of the aqueous polyurethane dispersion containing a double bond

EXAMPLES 40–47

A dispersion of Example 27, 30, 33 or 36, which contains a double bond, was taken, and an initiator and a chain extending agent which are suitable for the dispersion system were added as shown in Table 5. The mixture was fully stirred to prepare the system. The system was left untouched and even after 24 hours of observation no separation occurred. It is thought that this is because the components were dissolved into the particles of the dispersion.

TABLE 5

| Exp. No. | PU dispersion Exp. No. | Curing method | Initiator Name | amount (g) | Chain Extending agent Name | amount (g) | Condition |
|---|---|---|---|---|---|---|---|
| 40 | 27 | Thermal | BPO | 0.0219 | styrene | 2.3 | curing temp: 90° C. |
| 41 | 30 | Thermal | BPO | 0.0219 | styrene | 2.3 | |
| 42 | 33 | Thermal | BPO | 0.0149 | styrene | 2.0 | |
| 43 | 36 | Thermal | BPO | 0.0123 | styrene | 1.8 | |
| 44 | 27 | | BP | 0.0426 | styrene | 1.1 | UV |

TABLE 5-continued

| Exp. No. | PU dispersion Exp. No. | Curing method | Initiator Name | amount (g) | Chain Extending agent Name | amount (g) | Condition |
|---|---|---|---|---|---|---|---|
| 45 | 30 | UV | BP | 0.0426 | styrene | 1.1 | source: |
| 46 | 33 | | BP | 0.0288 | styrene | 1.0 | high |
| 47 | 36 | | BP | 0.0236 | styrene | 0.9 | pressure mercury lamp | cf) BPO: Benzoylperoxide
BP: Benzophenone

Preparation of a film by using an aqueous polyurethane dispersion, and properties thereof

EXAMPLES 48–62

A dispersion obtained in Examples 25–39 was poured on a polypropylene (PP) plate 10×20 cm). In order to obtain a film of smooth surface, the plate was left in a low temperature (50° C.) heat chamber for 3 hours, and then in a 80° C. heat chamber for 3 hours, to give a completely cured film. After separating the film from the plate, it was left for 24 hours in a reduced pressure heat chamber of 60° C./20 mmHg to completely remove the residual moisture. Then a film having a thickness of about 0.3±0.05 mm was obtained. The results of the appearance, the tensile strength at break, the elongation at break, the 100% modulus of the film are shown in Table 6.

EXAMPLES 63–70

A dispersion obtained in Examples 40–47 was poured on a polypropylene (PP) plate (10×20 cm). In order to fully remove moisture contained therein, the plate was left in a heat chamber at 50° C. for 4 hours. Then, in the case of thermal curing, the plate was placed in a heat chamber at 85° C. for 3 hours, to give a completely cured film. In the case of UV-curing, the plate was placed in a heat chamber at 80° C. to further remove moisture contained therein, and then UV light is emitted to give a cured film. After separating the film from the plate, it was left for 24 hours in a reduced pressure heat chamber of 60° C/20 mmHg in order to completely remove the residual moisture. Then a film having a thickness of about 0.3±0.05 mm was obtained. The results of the appearance, the break tensile strength, the break elongation, the 100% modulus are shown in Table 6.

TABLE 6

| Exp. No. | PU dispersion Exp. No. | Appearance of film | Physical properties Tensile strength at break (Kgf/cm$^2$) | Elongation at break (%) | 100% modulus (Kgf/cm$^2$) |
|---|---|---|---|---|---|
| 48 | 25 | somewhat soft | 149 | 642 | 40.8 |
| 49 | 26 | somewhat soft | 154 | 608 | 52.4 |
| 50 | 27 | soft | 89 | 458 | 13.5 |
| 51 | 28 | somewhat soft | 163 | 503 | 57.2 |
| 52 | 29 | somewhat soft | 175 | 490 | 60.5 |
| 53 | 30 | soft | 124 | 600 | 20.3 |
| 54 | 31 | hard | 228 | 367 | 69.9 |
| 55 | 32 | hard | 234 | 335 | 70.8 |
| 56 | 33 | soft | 150 | 500 | 20.3 |
| 57 | 34 | hard | 212 | 408 | 69.3 |
| 58 | 35 | hard | 237 | 357 | 72.5 |
| 59 | 36 | soft | 113 | 745 | 20.8 |
| 60 | 37 | somewhat soft | 173 | 612 | 32.9 |
| 61 | 38 | somewhat soft | 189 | 543 | 35.4 |
| 62 | 39 | somewhat soft | 195 | 507 | 35.9 |
| 63 | 40 | somewhat soft | 138 | 463 | 45.7 |
| 64 | 41 | somewhat soft | 163 | 513 | 63.1 |
| 65 | 42 | hard | 204 | 397 | 101.3 |
| 66 | 43 | hard | 211 | 413 | 125.4 |
| 67 | 44 | somewhat soft | 194 | 402 | 65.9 |
| 68 | 45 | hard | 235 | 477 | 132.3 |
| 69 | 46 | hard | 255 | 309 | 133.7 |
| 70 | 47 | hard | 253 | 402 | 135.4 |

While the present invention has been particularly shown and described with reference to the Examples, it will be understood by those skilled in the art that various changes in form and detail may be effected therein without departing from the spirit and scope of the invention as defined by the appended claims.

What is claimed is:

1. A process for preparing a polyurethane prepolymer containing carboxylic group(s), or both carboxylic group(s) and ethylenically unsaturated double bond(s), which comprises the steps of 1) preparing a diol or triol monomer having carboxylic group(s), or having both carboxylic group (s) and the ethylenically unsaturated double bond(s) by performing an addition reaction of at least one acid anhydride(s) which may contain the ethylenically unsaturated double bond(s), with at least one triol or tetraol containing three or four hydroxyl groups in a molar ratio from about 0.5:1 to about 2:1; and then reacting the obtained diol or triol monomer, or their mixture with a polyol and a diisocyanate or a diisocyanate polymer to give a polyurethane prepolymer having an NCO content of about 0.1 to about 30%.

2. The process as claimed in claim 1, wherein the step 2) is performed without using a solvent, or in the presence of not more than 30% of a water-miscible solvent having no reactive hydrogen.

3. The process as claimed in claim 1, wherein the acid anhydride without a double bond is selected from the group consisting of succinic anhydride, glutaric anhydride, methylsuccinic anhydride, hexahydro-4-methylphthalic anhydride, cis-1,2-cyclohexane-dicarboxylic anhydride, diglyconic anhydride, 3-ethyl-3-methylgluconic anhydride, phthalic anhydride, 3-nitrophthalic anhydride, 4-nitrophthalic anhydride, 1,2,4-benzene tricarboxylic anhydride, homophthalic anhydride, 2,3-pyridine dicarboxylic anhydride, 3,4-pyridine dicarboxylic anhydride, and mixtures thereof.

4. The process as claimed in claim 1, wherein the acid anhydride having the ethylenically unsaturated double bond (s) is selected from the group consisting of maleic anhydride, fumaric anhydride, itaconic anhydride, bromomeleic anhydride, 3,4,5,6-tetrahydrophthalic anhydride, 2 dodecen 1-yl-succinic anhydride, cis-aconitic anhydride, and mixtures thereof.

5. The process as claimed in claim 1, wherein the triol or tetraol is a monomer having three or four OH functional groups, or a polytriol or polytetraol of either an ether or having a molecular weight of about 100–4000, or a mixture thereof.

6. The process as claimed in claim 5, wherein the triol is a monomer selected from the group consisting of trimethylolpropane, glycerol, triethanolamine, a polytriol having a molecular weight of about 100–1000, and a mixture thereof, and the tetraol is a monomer selected from the group consisting of pentaerythritol, tris-(2-hydroxyethyl) isocyanurate, a polytetraol having a molecular weight of about 200–1500, and a mixture thereof.

7. The process as claimed in claim 1, wherein polyether polyol, polyester polyol, or their mixture having a molecular weight of 300–6500 is used as the polyol.

8. The process as claimed in claim 1, wherein the diisocyanate compound is selected from the group consisting of hexamethylene diisocyanate, 4,4-dicyclohexylmethane diisocyanate, 1,4-tetramethylene diisocyanate, 1,10-decamethylene diisocyanate, isophorone diisocyanate, 1,4-cyclohexane diisocyanate, toluene-2,4-diisocyanate, toluene-2,6-diisocyanate, 1,5-naphthalene diisocyanate, 4-methoxy-1,3-phenylene diisocyanate, 4-chloro-1,3-phenylene diisocyanate, 2,4-dimethyl-1,3-phenylene diisocyanate, 4,4-diisocyanate dibenzyl, methylene-bis(4-phenylisocyanate)-1,3-phenylene diisocyanate, and mixtures thereof.

9. The process as claimed in claim 1, wherein an NCO-prepolymer of a molecular weight of about 200–8000 is obtained.

10. The process as claimed in claim 1, wherein a molar ratio of the acid anhydride to the triol is from about 0.5:1 to about 1:1, the molar ratio of the acid anhydride to the tetraol is from about 0.5:1 to about 2:1, and the reaction temperature is about 50°–200° C.

11. The process as claimed in claim 1, wherein the reaction step 2) is performed with a molar ratio of NCO:OH being between about 0.5:1 to about 5:1, and at a temperature of about 40°–150° C.

12. A process for preparing a water-stable aqueous polyurethane dispersion, which comprises the steps of:
preparing a diol or triol monomer having carboxylic group(s), or having both carboxylic group(s) and ethylenically unsaturated double bond(s) by performing an addition reaction of at least one acid anhydride(s) which may contain the ethylenically unsaturated double bond(s), with at least one triol or tetraol containing three or four hydroxyl groups in a molar ratio from about 0.5:1 to about 2:1; reacting the obtained diol or triol monomer, or their mixture with a polyol, and a diisocyanate or a diisocyanate polymer to give a polyurethane prepolymer which contains carboxylic group (s), or containing both carboxylic group(s) and the ethylenically unsaturated double bond(s), and has no NCO content of about 0.1–30%;

neutralizing the carboxylic group of the obtained polyurethane prepolymer by using a neutralizer;
dispersing the neutralized polyurethane prepolymer in water; and
chain extending the dispersed the polyurethane prepolymer with a chain extending agent.

13. The process as claimed in claim 12, wherein the neutralizer is selected from the group consisting of water-soluble tertiary amines, alkali metal hydrides and mixtures thereof, and the molar ratio of carboxylic group to the neutralizer is from about 1:0.5 to about 1:1.2.

14. The process as claimed in claim 12, wherein the amount of water at the time of preparing the dispersion is determined to be an amount so that the overall solid content is in the range of about 5–80%, and the temperature of the water is about 5°–80° C.

15. The process as claimed in claim 12, wherein the chain extending agent is selected from the group consisting of diols, triols, diamines, triamines, hydrazines and dihydrazides which have reactive hydrogen and have a molecular weight of about 18–250.

16. The process as claimed in claim 12, wherein the neutralization and dispersion are performed simultaneously.

17. The process as claimed in claim 12, wherein the initiator, which forms free radicals by heat, is mixed, and then the chain extending agent is added, in the case of the aqueous polyurethane dispersion containing both carboxylic group(s) and the ethylenically unsaturated.

18. The process as claimed in claim 17, wherein an organic peroxide, an inorganic peroxide, an azo compound, a hydroperoxide, or a mixture thereof which initiates at 50°–200° C. is used as the initiator in an amount of about 0.01–1% by mole to the total amount of carboxylic group(s) with the ethylenically unsaturated and the chain extending agent(s).

19. The process as claimed in claim 17, wherein an acrylate derivative which is selected from the group consisting of 2-ethylhexyl acrylate, 2-hydroxyethyl acrylate, 2-hydroxypropyl acrylate, 2-phenoxyethyl acrylate, isobornyl acrylate, tetrahydrofurfuryl acrylate, propylene glycol monoacrylate, butanediol diacrylate, 1,6-hexanediol diacrylate, neopentyl glycol diacrylate, diethylene glycol diacrylate, tripropylene glycol diacrylate, trimethylolpropane triacrylate, pentaerythritol triacrylate, glyceryl propoxylated triacrylate, pentaerythritol tetraacrylate, dipentaerythritol tetraacrylate, alkoxylated tetraacrylate and ditrimethylol propane tetraacrylate, a styrene, an acrylonitrile, a vinyl chloride, or a mixture thereof is used as the chain extending agent in an amount of about 0.01–10% by weight of an overall solid content.

20. The process as claimed in claim 17, which further comprises the step of removing moisture from the dispersion in a heat chamber and then thermally curing the dispersion, or the step of simultaneously removing the moisture and thermal curing the dispersion.

21. The process as claimed in claim 12, wherein an initiator which initiates by UV rays, and a chain extending agent are added to the aqueous polyurethane dispersion containing both carboxylic group(s) and the ethylenically unsaturated, to give a UV curing system.

22. The process as claimed in claim 21, wherein an initiator selected from the group consisting of benzoin compounds, carbonyl compounds, sulfur compounds, naphthalenic compounds, condensed aromatic hydrocarbons, and metal salts, and which initiates in a wavelength range of about 180–460 nm, is used as the UV initiator in an amount of about 0.01–20 parts by weight to 100 parts of a total weight of carboxylic group with the ethylenically unsaturated and the chain extending agent(s).

23. The process as claimed in claim 21, wherein an acrylate derivative, styrene, acrylonitrile, vinyl chloride, or a mixture thereof is used as the chain extending agent in an amount of about 0.01–10% by weight of an overall solid content.

24. The process as claimed in claim 21, which further comprises the step of removing moisture from the dispersion in a heat chamber and then curing the dispersion by UV irradiation, or the step of simultaneously removing the moisture and UV curing the dispersion.

25. A coating agent comprising a water-stable aqueous polyurethane dispersion prepared in accordance with a process according to claim 12.

26. An adhesive agent comprising a water-stable aqueous polyurethane dispersion prepared in accordance with a process according to claim 12.

27. A paper sizing agent comprising a water-stable aqueous polyurethane dispersion prepared in accordance with a process according to claim 12.

28. A blending agent for cement comprising a water-stable aqueous polyurethane dispersion prepared in accordance with a process according to claim 12.

29. A resin for synthetic leathers comprising a water-stable aqueous polyurethane dispersion prepared in accordance with a process according to claim 12.

* * * * *